(12) United States Patent
Polley

(10) Patent No.: US 12,296,398 B1
(45) Date of Patent: May 13, 2025

(54) RECIPROCATING SAW BLADE MOUNTED DEPTH STOP

(71) Applicant: Beau Polley, Hindsville, AR (US)

(72) Inventor: Beau Polley, Hindsville, AR (US)

( * ) Notice: Subject to any disclaimer, the term of this patent is extended or adjusted under 35 U.S.C. 154(b) by 271 days.

(21) Appl. No.: 17/970,973

(22) Filed: Oct. 21, 2022

(51) Int. Cl.
*B23D 51/00* (2006.01)
*B23D 51/10* (2006.01)
*B23D 59/00* (2006.01)

(52) U.S. Cl.
CPC ........... *B23D 59/002* (2013.01); *B23D 51/10* (2013.01)

(58) Field of Classification Search
CPC ....... B23D 56/002; B23D 51/10; B23D 49/16
USPC .................................................. 30/208, 233
See application file for complete search history.

(56) References Cited

U.S. PATENT DOCUMENTS

| | | | | |
|---|---|---|---|---|
| 2,520,690 A | * | 8/1950 | O'Riley | B23D 59/002 |
| | | | | 83/441.1 |
| 2,853,106 A | | 9/1958 | Kanthack | 145/35 |
| 3,340,612 A | * | 9/1967 | Knight | A01G 3/08 |
| | | | | 30/394 |
| 3,372,481 A | * | 3/1968 | Skinner | B26B 19/06 |
| | | | | 30/221 |
| 3,550,896 A | | 12/1970 | Brown et al. | 248/473 |
| 3,628,247 A | * | 12/1971 | Lattin | B21F 99/00 |
| | | | | 30/233 |
| 4,114,270 A | | 9/1978 | Jansen-Herfeld et al. | 30/394 |
| 4,651,425 A | * | 3/1987 | Livian | B23D 51/10 |
| | | | | 30/507 |
| 5,014,430 A | * | 5/1991 | Wortham | B27B 19/006 |
| | | | | 30/166.3 |
| 5,016,356 A | * | 5/1991 | Trench | B23D 51/025 |
| | | | | 83/847 |
| 5,193,280 A | * | 3/1993 | Jackson | B28D 1/127 |
| | | | | 30/350 |
| 5,349,754 A | * | 9/1994 | Wuensch | B23D 49/006 |
| | | | | 30/392 |
| 5,596,810 A | * | 1/1997 | Neubert | B23D 51/01 |
| | | | | 30/392 |
| 5,644,847 A | * | 7/1997 | Odendahl | B23D 51/025 |
| | | | | 30/392 |
| 5,810,367 A | | 9/1998 | Holzer, Jr. et al. | 279/102 |
| 6,302,406 B1 | * | 10/2001 | Ventura | B23D 49/16 |
| | | | | 606/177 |
| 6,342,001 B1 | | 1/2002 | Larson | 451/356 |
| 7,171,760 B1 | * | 2/2007 | Lemon | B23D 59/002 |
| | | | | 33/833 |
| 7,328,513 B1 | * | 2/2008 | Yang | B26B 17/02 |
| | | | | 30/190 |

(Continued)

*Primary Examiner* — Omar Flores Sanchez
(74) *Attorney, Agent, or Firm* — Keisling & Pieper PLC; David B. Pieper; Trent C. Keisling

(57) ABSTRACT

A reciprocating saw blade mounted depth stop for a reciprocating saw blade. The depth stop includes a U-shaped body mounted to the blade center body web with a sliding flange face positioned at a linear cut depth from the blade cutting edge and an angled nose face positioned at a nose cut depth from the blade nose tip so that a reciprocating saw blade can be used to cut items such as electrical conduit without harming items inside the conduit. The stop body defines a body slot aperture sized for accepting the blade center body web adjacent the sliding flange face and a set of opposing clamps positioned to clamp the blade center body web within the body slot aperture to control the nose cut depth and the linear cut depth.

6 Claims, 5 Drawing Sheets

(56) References Cited

U.S. PATENT DOCUMENTS

| | | | | |
|---|---|---|---|---|
| 7,631,584 | B2* | 12/2009 | Quinn | B23D 51/10 |
| | | | | 83/13 |
| D616,277 | S | 5/2010 | Molina et al. | D8/82 |
| 7,883,308 | B2 | 2/2011 | Hung | 411/393 |
| 8,919,787 | B1* | 12/2014 | Wilcher | B23D 49/11 |
| | | | | 279/143 |
| 10,118,238 | B2 | 11/2018 | Kazda et al. | B23D 61/128 |
| 10,363,619 | B2 | 7/2019 | George et al. | B23D 61/121 |
| 10,393,368 | B2 | 8/2019 | Smith | F22B 37/58 |
| 10,618,124 | B2 | 4/2020 | Kalomeris et al. | B23D 61/123 |
| 10,639,732 | B2 | 5/2020 | Butzen | B23D 61/121 |
| 10,639,733 | B2 | 5/2020 | Campbell et al. | B23D 61/126 |
| 10,646,937 | B2 | 5/2020 | Muti et al. | B23D 61/123 |
| 11,051,458 | B2* | 7/2021 | Wilson | A01G 3/085 |
| 11,065,700 | B1* | 7/2021 | Chipman | B23D 59/002 |
| 2001/0042310 | A1* | 11/2001 | Steele | B23D 49/105 |
| | | | | 30/375 |
| 2002/0095800 | A1* | 7/2002 | Bone | B23D 51/046 |
| | | | | 30/372 |
| 2009/0277014 | A1* | 11/2009 | Sergyeyenko | A01G 3/053 |
| | | | | 30/233 |
| 2010/0050443 | A1* | 3/2010 | Casota | B23D 51/025 |
| | | | | 30/289 |
| 2019/0232402 | A1* | 8/2019 | Wekwert | B23D 49/165 |
| 2023/0226714 | A1* | 7/2023 | Moeller | B27B 9/00 |
| | | | | 30/383 |
| 2024/0066728 | A1* | 2/2024 | Kearney | B23D 51/10 |

\* cited by examiner

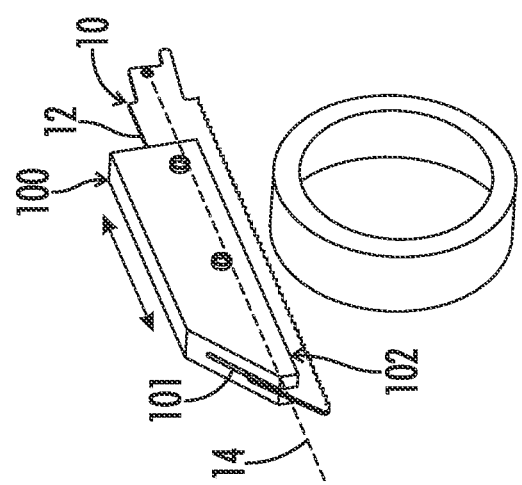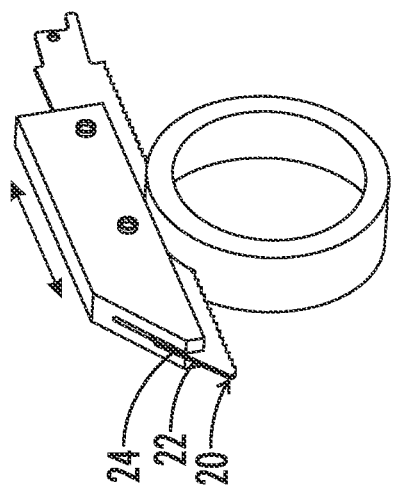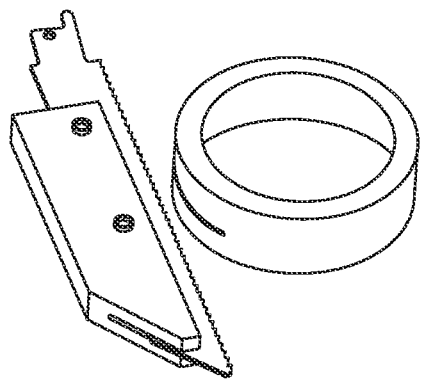

RECIPROCATING SAW BLADE MOUNTED DEPTH STOP

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

1 Field of the Invention

The present invention relates to improvements in reciprocating saws. More particularly, the invention relates to improvements particularly suited for providing a blade mounted depth stop for cutting control depths with a reciprocating saw blade. In particular, the present invention relates specifically to a blade depth stop for cutting into electrical conduit and limiting the depth of the cut to the thickness of the conduit to avoid cutting the shielding and wires located inside the conduit.

2. Description of the Known Art

As will be appreciated by those skilled in the art, reciprocating saws are known in various forms. Patents disclosing information relevant to reciprocating saws include: U.S. Pat. No. 10,646,937, issued to Muti, et al. on May 12, 2020 entitled Saw blade with multiple tangs and methods of use; U.S. Pat. No. 10,639,733, issued to Campbell, et al. on May 5, 2020 entitled Reciprocating saw blade; U.S. Pat. No. 10,639,732, issued to Butzen, et al. on May 5, 2020 entitled Saw blade; U.S. Pat. No. 10,618,124, issued to Kalomeris, et al. on Apr. 14, 2020 entitled Reciprocating saw blade; and U.S. Pat. No. 10,363,619, issued to George, et al. on Jul. 30, 2019 entitled Reciprocating saw blade. Each of these patents is hereby expressly incorporated by reference in their entirety.

From these prior references it may be seen that these prior art patents are very limited in their teaching and utilization, and an improved depth stop is needed to overcome these limitations.

SUMMARY OF THE INVENTION

The present invention is directed to an improved reciprocating saw blade mounted depth stop using a slotted stop body with opposing mounting bolts to mount the body to the blade center web to position at least one sliding flange face at a cutting depth from the saw teeth and/or a face flange to stop the depth of a plunge cut. The saw blade mounted depth stop is mounted to the blade such that the depth stop moves back and forth or in the same reciprocating or oscillating motion as the blade itself.

In accordance with one exemplary embodiment of the present invention, two front positioned and two back positioned opposing mounting bolts are used to clamp the slotted stop body to the blade's center body web. The bolts use bolt threads matching aperture threads in body mounting apertures to create the clamping force.

These and other objects and advantages of the present invention, along with features of novelty appurtenant thereto, will appear or become apparent by reviewing the following detailed description of the invention.

BRIEF DESCRIPTION OF THE SEVERAL VIEWS OF THE DRAWINGS

In the following drawings, which form a part of the specification and which are to be construed in conjunction therewith, and in which like reference numerals have been employed throughout wherever possible to indicate like parts in the various views:

FIG. 1 is a perspective view of a reciprocating saw blade mounted depth stop mounted on a reciprocating saw blade close to the saw teeth aligned above a conduit pipe.

FIG. 2 is another perspective view showing the blade stop limiting the depth of the cut.

FIG. 3 is a further perspective view showing the saw blade removed from the kerf cut.

DETAILED DESCRIPTION OF THE INVENTION

Figure 4:
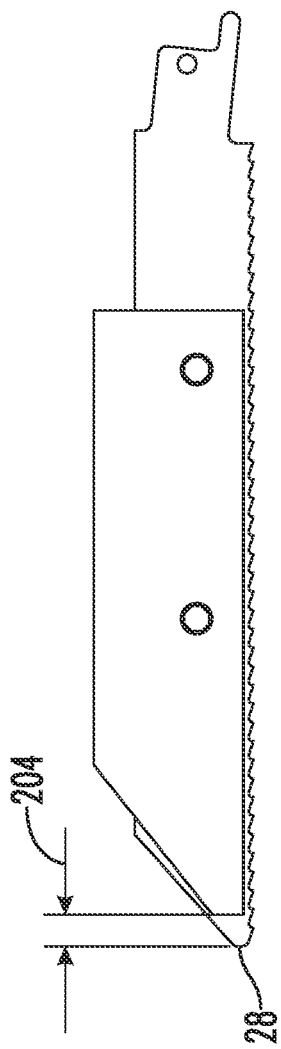
FIG. 4 is a side view showing a small depth of cut.
Figure 5:
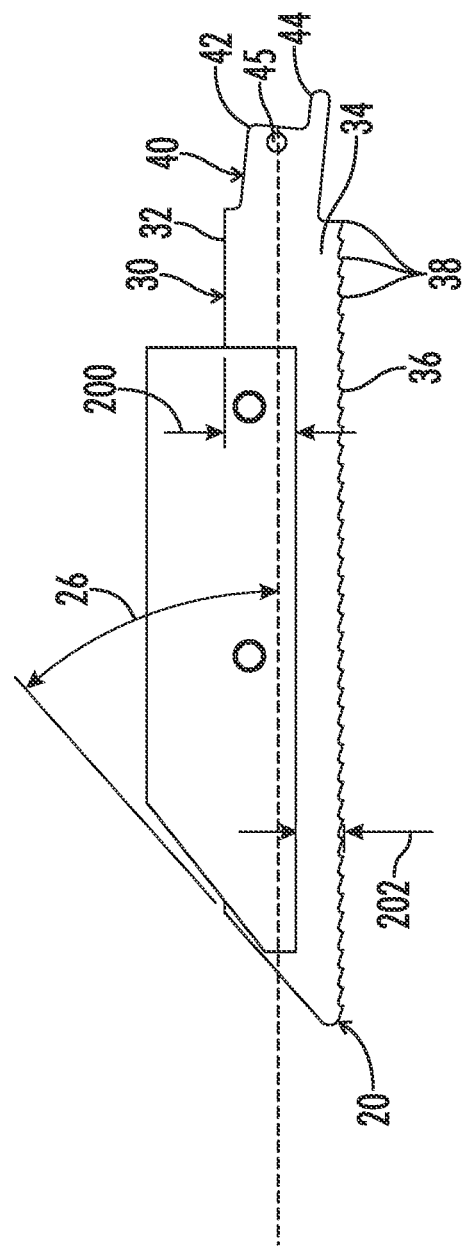
FIG. 5 is a side view showing a larger depth of cut.

As shown in FIGS. 1-15 of the drawings, one exemplary embodiment of the present invention is generally shown as a reciprocating saw blade depth stop 100 for mounting on a reciprocating saw blade 10.

The reciprocating saw blade 10 is made with a longitudinal saw body 12 defining a longitudinal saw axis 14 extending from a first saw blade end 20 through a linear central body 30 to a second saw blade end 40. The first saw blade end 20 includes an angled blade nose 22 with a blade nose edge 24 and blade nose angle 26. The linear central body 30 includes a blade top edge 32 on a blade center body web 34 extending continuously to a linear blade cutting edge 36 having saw blade teeth 38. The second saw blade end 40 includes the saw mounting structure 42 with a mounting tang 44 and mounting aperture 45.

The reciprocating saw blade depth stop 100 uses a body slot aperture 101 in a stop body 102 for mounting on the reciprocating saw blade 10 such that the depth stop 100 moves with the motion of the blade 10. The stop body 102 defines a body slot aperture 101 extending from a body nose 110 through a central body span 120 to the body back 160. the body slot aperture 101 is sized to allow for the blade center body web 34 to be inserted into the depth stop 100.

Figure 15:
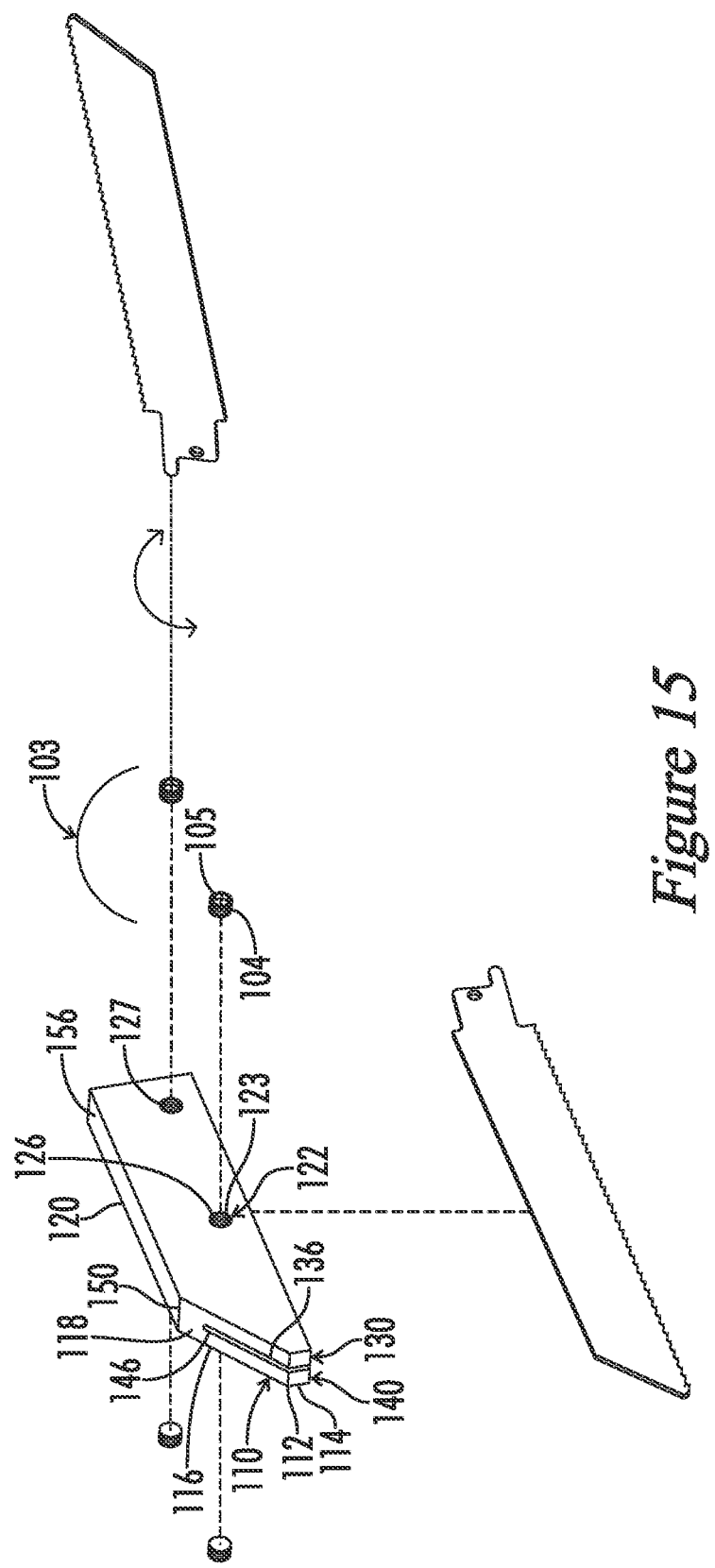
FIG. 15 is an exploded view showing the reciprocating saw blade mounted depth stop in relation to a reciprocating saw blade.

The reciprocating saw blade 10 is inserted into the body slot aperture 101 and then clamped with opposing mounting bolt clamps 103. Each opposing mounting bolt 103 includes bolt threads 104 and a drive connection 105 so that it can simply be rotated and torqued to clamp down onto the reciprocating saw blade 10. As shown in FIG. 15, note that the drive connection 105 is sized so that the mounting tang 44 on another blade can be used as a tool to tighten/install and loosen/remove the opposing mounting bolts 103.

There are four opposing mounting bolt 103 shown as the first side mid mount threaded bolt 106, first side back mount threaded bolt 107, second side mid mount threaded bolt 108, and second side back mount threaded bolt 109.

The body nose 110 includes a nose tip 112 with a tip face 114 that is blunted to allow for the blade nose edge 24 to still be used. The body nose 110 also includes a nose dorsum 116 with a dorsum face 118 defining the front end of the body slot aperture 101.

The central body span 120 defines the mounting apertures 122 with their associated aperture threads 123. The mounting apertures are shown as the first side mid mounting aperture 126, first side back mounting aperture 127, second side mid mounting aperture 128, and second side back mounting aperture 129. The U shape of the central body span 120 is formed from a first side flange 130 connected to a second side flange 140 by a top crossing web 150. The first side flange 130 includes a lower tooth side first sliding flange face 132 that is made at a perpendicular sliding face angle 133 to ride along the edge of the conduit or other item being cut. The first side flange 130 also includes a first outer flange face 134 and a first inner flange face 136. Similarly, the second side flange 140 includes a second sliding flange face 142 on the lower edge near the saw tooth and also incudes a second outer flange face 144 and second inner flange face 146. The top crossing web 150 includes an inner web face 152 made with a web radius 154 and an outer web face 156 that is smooth in the preferred embodiment but could be knurled or otherwise roughened to provide a sanding ability. The body back 160 is made with back face 162 toward the saw connection that should be positioned far enough from the saw shoe for the reciprocating operation of the blade 10.

The insertion depth 200 of the blade 10 into the body slot aperture 101 and the amount of exposure on the blade center body web 34 down to the saw blade teeth 38 defines the cut depth 202.

Figure 6:
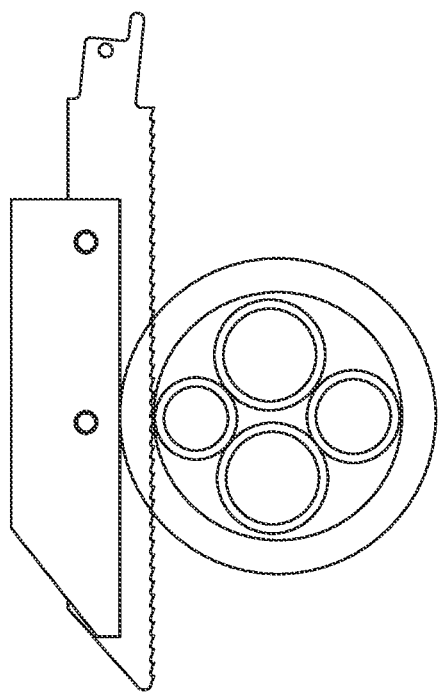
FIG. 6 is a side view showing a small depth of cut set for a thin wall pipe.
Figure 7:
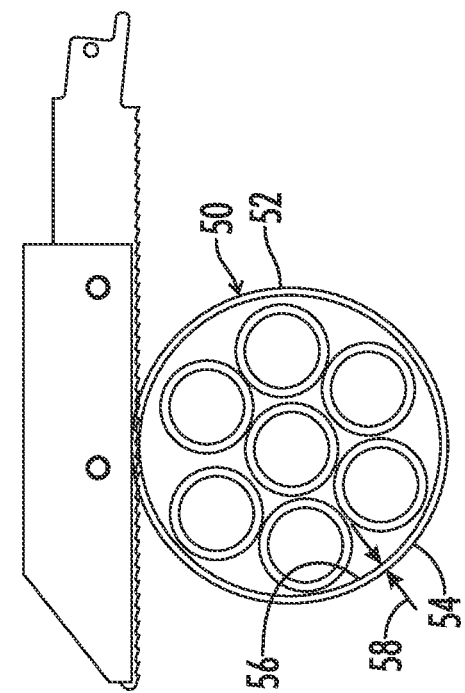
FIG. 7 is a side view showing a larger depth of cut set for a thick wall pipe.
Figure 8:
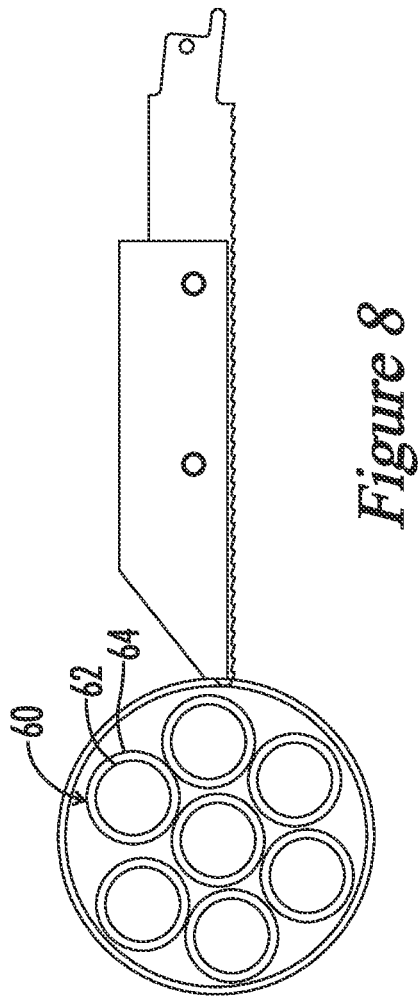
FIG. 8 is a side view showing a nose depth cut set for a thin wall pipe.
Figure 13:
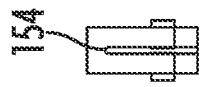
FIG. 13 shows a front view thereof.
Figure 12:
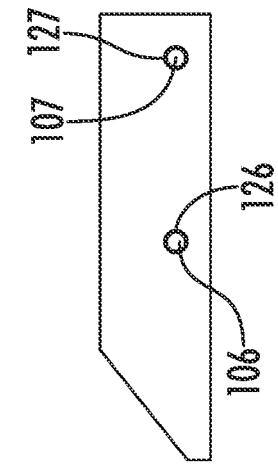
FIG. 12 shows a right side view thereof.
Figure 11:
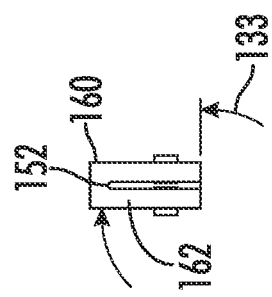
FIG. 11 shows a back view thereof.
Figure 10:
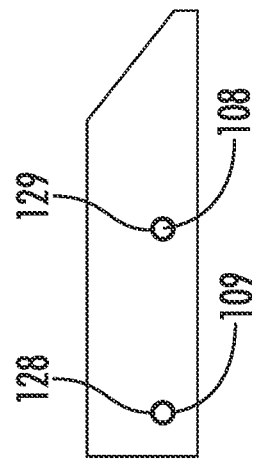
FIG. 10 shows a left side view thereof.
Figure 9:
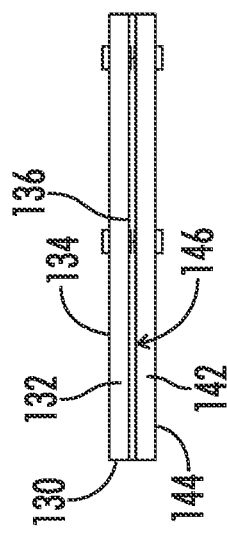
FIG. 9 shows a bottom view of the reciprocating saw blade mounted depth stop.
Figure 14:
FIG. 14 shows a top view thereof.

Use of the reciprocating saw blade depth stop 100 can best be understood by reviewing FIGS. 1 through 7 which show how the reciprocating saw blade 10 cuts into the pipe 50. The pipe 50 has a pipe wall 52 extending from an outer surface 54 to an inner surface 56 defining a wall thickness 58. The problem with using a normal reciprocating saw blade 10 is that after cutting through the pipe wall 52 the blade will continue to cut through the electrical wires 60 and its insulating sheathing 64 and inner conductor 62. Cutting any part of the electrical wires 60 will necessitate either a repair or a replacement of the electrical wires 60 that are affected. Because of the high price of both labor and wire, this can be a costly proposition. FIGS. 2, 6, 7, and 8 show how the reciprocating saw blade depth stop 100 avoids this problem by stopping the depth of cut when the first sliding flange face 132 and/or second sliding flange face 142 contact and slide along the outer surface 54 of the pipe 50 or when the tip face 114 impacts the outer surface 54 during a plunge cut. The contact of the sliding flange face 132, 142 or the tip face 114 with the outer surface 54 stops the saw blade teeth 58 from cutting any deeper. FIGS. 6 and 8 show how the tip face 114 can be set to limit the plunge cut of the reciprocating saw blade 10 and FIGS. 1-3, 5 and 7 show how the tip can be left without this limit so that the depth stop 100 can be positioned further back on the blade toward the saw mounting structure 42. As shown in FIGS. 6-8, the adjustability of the positioning of the stop body 102 using the opposing mounting bolt clamps 103 allows for the linear cut depth 202 and nose cut depth 204 to be controlled according to the pipe wall thickness 58 so that even when different sizes of pipe 50 are full of electrical wires 60 the reciprocating saw blade depth stop 100 allows for an accurate cut without harming the electrical wires 60. The cut can be made all the way around the pipe 50 and then along the pipe 50 in one or more locations to remove a section of pipe without disturbing the electrical wires 60. Note that the body back 160 and back face 162 have to be positioned far enough away from the saw mounting structure 42 to allow for mounting the blade 10 to the saw.

Reference numerals used throughout the detailed description and the drawings correspond to the following elements:
reciprocating saw blade 10
longitudinal saw body 12
longitudinal saw axis 14
a first saw blade end 20
angled blade nose 22
blade nose edge 24
blade nose angle 26
blade nose tip 28
linear central body 30
blade top edge 32
blade center body web 34
linear blade cutting edge 36
saw blade teeth 38
second saw end 40
saw mounting structure 42
mounting tang 44
mounting aperture 45
pipe 50
pipe wall 52
outer surface 54
inner surface 56
wall thickness 58
electrical wires 60
inner conductor 62
insulating sheathing 64
reciprocating saw blade depth stop 100
body slot aperture 101
stop body 102
opposing mounting bolt clamps 103
bolt threads 104
drive connection 105
first side mid mount threaded bolt 106
first side back mount threaded bolt 107
second side mid mount threaded bolt 108
second side back mount threaded bolt 109
body nose 110
nose tip 112 tip face 114
nose dorsum 116
dorsum face 118
central body span 120
mounting apertures 122
aperture threads 123
first side mid mounting aperture 126
first side back mounting aperture 127
second side mid mounting aperture 128
second side back mounting aperture 129
first side flange 130
first sliding flange face 132
sliding face angle 133
first outer flange face 134
first inner flange face 136
second side flange 140
second sliding flange face 142
second outer flange face 144
second inner flange face 146
top crossing web 150
inner web face 152
web radius 154
outer web face 156
body back 160
back face 162
insertion depth 200
linear cut depth 202
nose cut depth 204

From the foregoing, it will be seen that this invention well adapted to obtain all the ends and objects herein set forth, together with other advantages which are inherent to the structure. It will also be understood that certain features and subcombinations are of utility and may be employed without reference to other features and subcombinations. This is contemplated by and is within the scope of the claims. Many possible embodiments may be made of the invention without departing from the scope thereof. Therefore, it is to be understood that all matter herein set forth or shown in the accompanying drawings is to be interpreted as illustrative and not in a limiting sense.

When interpreting the claims of this application, method claims may be recognized by the explicit use of the word 'method' in the preamble of the claims and the use of the 'ing' tense of the active word. Method claims should not be interpreted to have particular steps in a particular order unless the claim element specifically refers to a previous element, a previous action, or the result of a previous action. Apparatus claims may be recognized by the use of the word 'apparatus' in the preamble of the claim and should not be interpreted to have 'means plus function language' unless the word 'means' is specifically used in the claim element. The words 'defining,' 'having,' or 'including' should be interpreted as open ended claim language that allows additional elements or structures. Finally, where the claims recite "a" or "a first" element of the equivalent thereof, such claims should be understood to include incorporation of one or more such elements, neither requiring nor excluding two or more such elements.

What is claimed is:

1. A reciprocating saw blade depth stop apparatus for a reciprocating saw blade cutting into a surface to a depth, the reciprocating saw blade moving with a blade motion in relation to a longitudinal saw body, the reciprocating saw blade including a blade center body web, a blade cutting edge, and a saw mounting structure, the reciprocating saw blade depth stop apparatus comprising:
   a moving stop body with a first sliding flange face;
   the moving stop body defining a body slot aperture sized for accepting the blade center body web adjacent the sliding flange face;
   the moving stop body including opposing clamps positioned proximate the first sliding flange face and the body slot aperture to fixably clamp the blade center body web within the body slot aperture and extend the blade cutting edge from the first sliding flange face, the moving stop body moving with the moving motion of the reciprocating saw blade and the first sliding flange face contacting the surface to limit the depth of the cutting.

2. The apparatus of claim 1, further comprising:
   the moving stop body defining mounting apertures with aperture threads;
   the opposing clamps including bolt threads engaging the aperture threads.

3. The apparatus of claim 1, further comprising:
   the opposing clamps including a recessed drive connection.

4. The apparatus of claim 3, the saw mounting structure including a tang, the apparatus further comprising:
   the recessed drive connection sized to fit the tang.

5. The apparatus of claim 1, further comprising:
   the moving stop body including a body nose.

6. The apparatus of claim 5, further comprising:
   the body nose defining a tip face.

\* \* \* \* \*